United States Patent [19]

Spies

[11] Patent Number: 6,035,273
[45] Date of Patent: Mar. 7, 2000

[54] SPEAKER-SPECIFIC SPEECH-TO-TEXT/ TEXT-TO-SPEECH COMMUNICATION SYSTEM WITH HYPERTEXT-INDICATED SPEECH PARAMETER CHANGES

[75] Inventor: Carl Joseph Spies, La Fox, Ill.

[73] Assignee: Lucent Technologies, Inc., Murray Hill, N.J.

[21] Appl. No.: 08/673,242

[22] Filed: Jun. 26, 1996

[51] Int. Cl.[7] ........................................... G10L 5/00
[52] U.S. Cl. .................. 704/270; 704/235; 704/260
[58] Field of Search ............................... 704/235, 260, 704/270

[56] References Cited

U.S. PATENT DOCUMENTS

| | | | |
|---|---|---|---|
| 4,707,858 | 11/1987 | Fette | 704/251 |
| 5,157,759 | 10/1992 | Bachenko | 395/2.75 |
| 5,278,943 | 1/1994 | Gasper et al. | 395/2.09 |
| 5,384,701 | 1/1995 | Stentiford et al. | 395/753 |
| 5,647,002 | 7/1997 | Brunson | 380/49 |
| 5,696,879 | 12/1997 | Cline et al. | 704/260 |

OTHER PUBLICATIONS

Barry Arons, "Hyperspeech: Navigating in Speech–Only Hypermedia", Proceedings of the Third ACM Conference on Hypertext, Hypertext '91, Dec. 1991.

*Primary Examiner*—David R. Hudspeth
*Assistant Examiner*—Tālivaldis Ivars Šmits

[57] ABSTRACT

The invention consists of speech compression and transmission devices (CTD) connected to one another for transmission of signals therebetween via any transmission media including the public switched telephone network, a cellular network, a satellite or submarine communications system or any combination of such existing networks and systems. Each CTD consists of a speech profile defining the coefficients of speech for any person that will be using that device, a means for converting speech to text, and a means for converting text to speech based on the speech profile. When a connection is established between the devices, the speech profiles of the calling party and the called parties are exchanged such that the calling party's CTD stores in RAM the called party's speech profile and the called party's CTD stores in RAM the calling party's speech profile. When either one of the parties speaks, that party's speech is converted into text. Changes in picth, rate, and volume of the speech are detected, and the amount of change indicated by hypertext characters inserted in the text. The text is transmitted from the speaking party's device to the listening party's device where it is converted back into speech using the speaking party's speech profile. Because speech typically occurs at a rate of between 4 and 5 words per second with an average of 4.2 characters per word, normal speech generates approximately 20 characters per second. Assuming the formatted text uses 8 bits to define a character such as for standard ASCII text plus hypertext characters, the system of the invention transmit speech at a data rate of 160–300 bits per second, a data rate significantly lower than known speech compression techniques.

30 Claims, 3 Drawing Sheets

SPEAKER-SPECIFIC SPEECH-TO-TEXT/ TEXT-TO-SPEECH COMMUNICATION SYSTEM WITH HYPERTEXT-INDICATED SPEECH PARAMETER CHANGES

BACKGROUND OF THE INVENTION

The invention relates, generally, to telecommunications networks and, more particularly, to a compressed voice communication system that operates at an extremely low data rate.

It will be understood that speech is transmitted in a variety of different types of networks such as the public switched telephone network, satellite communications systems, submarine communications systems, cellular telephone systems, personal communications systems and the like. In the public switched telephone network, almost all speech is band-limited to the 200 to 3,800 hertz (Hz) range. This band-limited signal is often referred to as telephone bandwidth speech. Telephone bandwidth speech is sampled 8,000 times per second (8 Khz) and quantized with an 8-bit logarithm's quantizer, making the normal bit rate used for transmission in the public switched telephone network 64 kilobits per second (Kbps). The 64 Kbps data rate used in the public switched telephone network accurately represents speech with minimal degradation in speech quality.

While the 64 Kbps data rate is adequately supported in the public switched telephone network where bandwidth limitations are generally not a problem, other applications and/or telecommunications systems are not able to support this relatively high data rate. For example, satellite communications systems, cellular telephone systems, submarine communications systems and other communications systems that have limited bandwidth all require data rates lower than the 64 Kbps data rate of the public switched telephone network. Moreover, even though the public switched telephone network adequately supports the 64 Kbps data rate, the ability to transmit speech at much lower data rates with minimum quality degradation would greatly increase the efficiencies of the public switched telephone network for some applications. As a result, numerous speech compression techniques have been developed for compressing speech into a signal having a data rate lower than the 64 Kpbs telephone bandwidth speed.

Typically, speech compression is obtained using speech coders, as are known in the art, that exploit the natural redundancies and pauses in speech and the properties of human hearing to compress speech into a relatively low bit rate data stream. The degree of compression is measured by how much the bit rate is lowered from the 64 Kbps telephone bandwidth speech. International standards exist for coders operating at 40, 32, 24 and 16 Kbps and are planned for rates as low as 4 Kbps. Moreover, regional cellular standards span the data rate range from 13 to 3.45 Kbps. While existing speech compression techniques have reduced the bandwidth required for transmitting speech, the bit rate of the compressed speech is on the same order of magnitude as the bit rate of telephone bandwidth speech. An even greater reduction in bit rate is desired for such applications as video telephony where the bandwidth needed for the video portion limits the bandwidth available for speech, satellite communication systems where capacity can only be increased by reducing bit rate, cellular and internet applications where limited bandwidth is in increasingly high demand and any other bandwidth sensitive applications.

Thus, an improved communications system for compressing and transmitting speech is desired.

SUMMARY OF THE INVENTION

One embodiment of the invention consists of a speech compression and transmission device (CTD) located at the customer premise of any party desiring access to the speech compressed communications system of the invention. The CTDs are connected to one another for transmission of signals therebetween via any transmission media including the public switched telephone network, a cellular network, a satellite or submarine communications system or any combination of such existing networks and systems. Each CTD consists of a speech profile defining the coefficients of speech for any person that will be using that device, a means for converting speech to text, and a means for converting text to speech. When a connection is established between a first one of the devices and a second one of the devices (i.e. from a calling party to a called party), the speech profile of the calling party is transmitted to and stored at the called party's CTD and the speech profile of the called party is transmitted to and stored at the calling party's CTD such that the speech profiles of both parties are stored at both CTDs. When either one of the parties speaks, that party's speech is converted into text via the means for converting speech to text using that party's speech profile. The text is transmitted from the speaking party's CTD to the listening party's CTD where it is converted back into speech by the means for converting text to speech again using the speaking party's speech profile. Because speech typically occurs at a rate of between 4 and 5 words per second with an average of 4.2 characters per word, normal speech generates approximately 20 characters per second. Assuming the formatted text uses 8 bits to define a character such as for standard ASCII text plus hypertext characters, the system of the invention transmits speech at a data rate of 160–300 bits per second, a data rate significantly lower than known speech compression techniques.

DETAILED DESCRIPTION OF THE INVENTION

Figure 1:
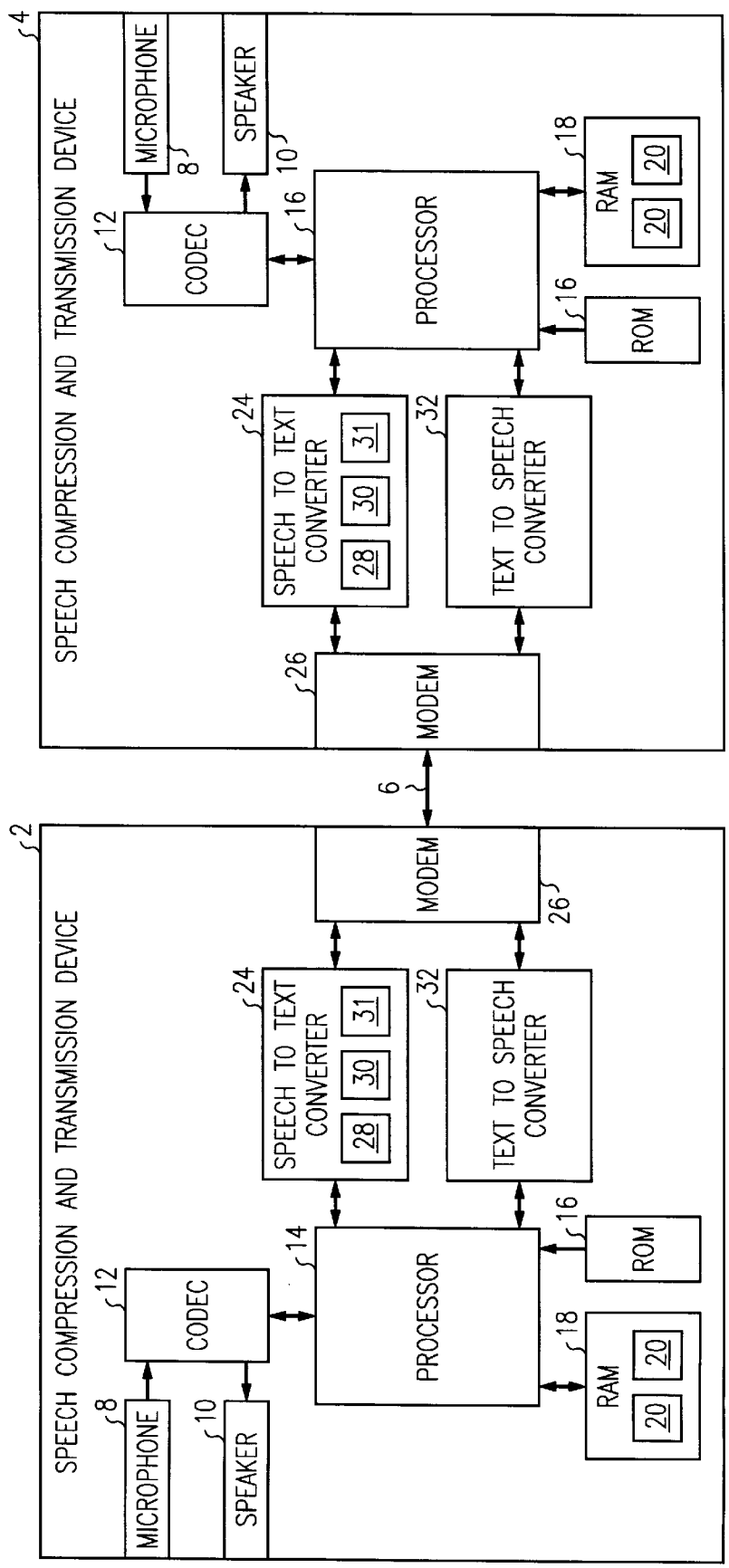
FIG. 1 is a block diagram illustrating a first embodiment of the system of the invention.

Referring more particularly to FIG. 1, a compressed voice communication system according to the invention is illustrated consisting of a first speech compression and transmission device (CTD) 2 and a second speech compression and transmission device (CTD) 4 connected to one another via a transmission media 6. In the embodiment illustrated in FIG. 1, CTDs 2 and 4 constitute customer premise equipment such as telephone stations, multimedia equipment or any other customer device capable of receiving and transmitting speech as will hereinafter be described. The transmission media 6 can consist of any structure capable of transmitting a signal between the CTDs 2 and 4 such as a wireless radio frequency interface, twisted wire pair, coaxial cable, satellite or internet. Moreover, the transmission media could include a plurality of switching systems, a cellular network, a satellite link, or the like or a combination of such systems provided that the compressed speech signal from one CTD can be transmitted to and received at another CTD. While in the illustrated embodiment only two CTDs 2 and 4 are shown in communication with one another, it will be appreciated that as many CTDs as desired can be interconnected via the transmission media 6.

CTDs 2 and 4 are identical in construction and operation such that specific reference will be made to CTD 2. CTD 2 includes a microphone 8 for receiving acoustical sound (speech) from an individual and for converting the acoustical sound into an electrical signal, and a speaker 10 for converting an electrical signal into acoustical sound and for delivering the acoustical sound to the individual. The microphone 8 and speaker 10 can be located on a handset such as in a conventional telephone, could consist of separate elements such as on a typical multimedia station or can constitute any similar human to customer premise equipment interface.

A codec 12 converts between an analog and digital signal as is known in the art and can consist of T7570 manufactured and sold by Lucent Technologies Inc. Specifically, codec 12 takes analog signals from the microphone 8 and converts them into digital signals for delivery to processor 14. Likewise, codec 12 takes digital signals from processor 14 and converts the digital signals into analog signals for delivery to speaker 10.

The digital signals delivered to processor 14 from codec 12 are then converted into text for subsequent delivery to another CTD via the transmission media 6. To provide the speech to text conversion, processor 14 communicates with ROM 16 that contains the stored program control for operation of the system. RAM 18 includes the speech profiles 20 of all individuals that will use CTD 2 as their "home" CTD. Each speech profile defines the coefficients of speech for a particular individual and is used by the CTDs to convert the speech into text and to convert text to speech. It will be appreciated that there are six coefficients of speech that define human speech. These coefficients are: 1) losses from friction of the vocal tract walls; 2) composition of the vocal tract walls; 3) nasal coupling; 4) radiation of sound at the lips; 5) excitation of sound in the vocal tract (volume); and 6) time variation of the vocal tract (rate and pitch). These factors are incorporated in a mathematical model that models human speech, as is known in the art. This mathematical model "learns" the individual's voice and determines the best acoustic word match. The mathematical model is stored in RAM 18 as the individual's speech profile. To actually perform the speech to text conversion, a speech to text converter 24 is accessed by the processor 14 as is the individual's speech profile 20. The speech to text converter can consist of commercially available software such as Dragon Systems Dragon Dictate or IBM's VoiceType Dictation. These systems use the stored speech profile to determine the best acoustic word match for any spoken word. The selected words are then compared with a language model that chooses the appropriate word based on the context of the speech and language and grammar rules. The chosen words are defined in ASCII text (or any other suitable text format) and are transmitted via modem 26 in ASCII text format over transmission media 6 to a receiving CTD.

Because the ASCII text must be converted back into speech at the receiving CTD and it is important that the speech delivered at the receiving CTD sound like the speaker, the system makes use of hypertext characters in the ASCII text to make conversion of the text to speech a more accurate representation of the original speech. Of the six coefficients of speech listed previously, the first four remain relatively constant over time while the fifth and sixth coefficients, time variation of the vocal tract (rate and pitch) and excitation of sound (volume) are most likely to change dynamically. It will be appreciated that rate defines how fast a person is talking, pitch defines the frequency, and volume defines how loud a person is talking. During a conversation the speed, frequency and volume of speech can change as will be understood. In order to accurately represent these changes, the system of the invention uses a volume detector 28 such as an integrator and analog to digital converter or any similar device and a digital frequency counter 30 for sampling the frequency of the signal and a character counter 31 for determining the syllables per second (speed). These samples are then used to modify the speech conversion using hypertext characters as will hereinafter be described.

When the speech profile 20 is created for an individual, the average rate, pitch and volume of the person's voice are determined and made part of the speech profile. When that individual speaks into microphone 8, during a conversation between CTDs, the pitch, rate and volume of the speech are continuously sampled. Because human speech is relatively slow, sampling can be relatively infrequent such as once every 100 milliseconds. The pitch, rate and volume of the sampled speech are compared to the average pitch, rate and volume for that individual. To the extent the sampled pitch, rate and volume differ from the averages by at least a predetermined amount (e.g. 10%) hypertext characters are inserted before each text syllable to indicate the increase or decrease in the rate, pitch and/or volume.

The system of the invention uses the basic 7 bits ASCII character set (defined as 0x00 to 0x7F) and the hypertext characters (0x80 to 0xFF). The hypertext characters are used to indicate the pitch and rate differentials as defined below:

```
0x8_ or 1 0 0 0 a a a a - increase pitch by aaaa hz where aaaa = 0000 to 1111
0x9_ or 1 0 0 1 a a a a - increase pitch by (16 + aaaa) hz where aaaa = 0000 to 1111
0xa_ or 1 0 1 0 a a a a - decrease pitch by aaaa hz where aaaa = 0000 to 1111
0xb_ or 1 0 1 1 a a a a - decrease pitch by (16 + aaaa) hz where aaaa = 0000 to 1111
0xc_ or 1 0 0 0 b b b b - increase rate by (bbbb x .1) syllables/seconds where bbbb = 0000 to 1111
0xd_ or 1 0 0 1 b b b b - decrease rate by (bbbb x .1) syllables/seconds where bbbb = 0000 to 1111
0xe_ or 1 0 1 0 c c c c - increase volume (magnitude) by cccc db where cccc = 0000 to 1111
0xf_ or 1 0 1 1 c c c c - decrease volume (magnitude) by cccc db where cccc = 0000 to 1111
```

Once the speech profile is created, the speech to text converter 24 can create an accurate representation of an individual's speech in ASCII text format for delivery to another CTD including rate and pitch variations.

The CTD 2 also includes a text to speech converter 32 for converting the ASCII text received via transmission media 6 and modem 26 back into speech. When a connection is established between CTD 2 and another CTD, the speech profile of the individual using the other CTD is transmitted to CTD 2. The CTD 2 temporarily stores in RAM 18 the speech profile of the other individual for the duration of the call. When text is received from that individual the text to speech converter 32 recreates the speech using the speech profile temporarily stored in RAM 18. The use of the hypertext characters allows the CTD to accurately reproduce the speech even where the individual's pitch or rate changes during the conversation. The text to speech converter can consist of Centigram's TruVoice system or any similar system.

Figure 2:
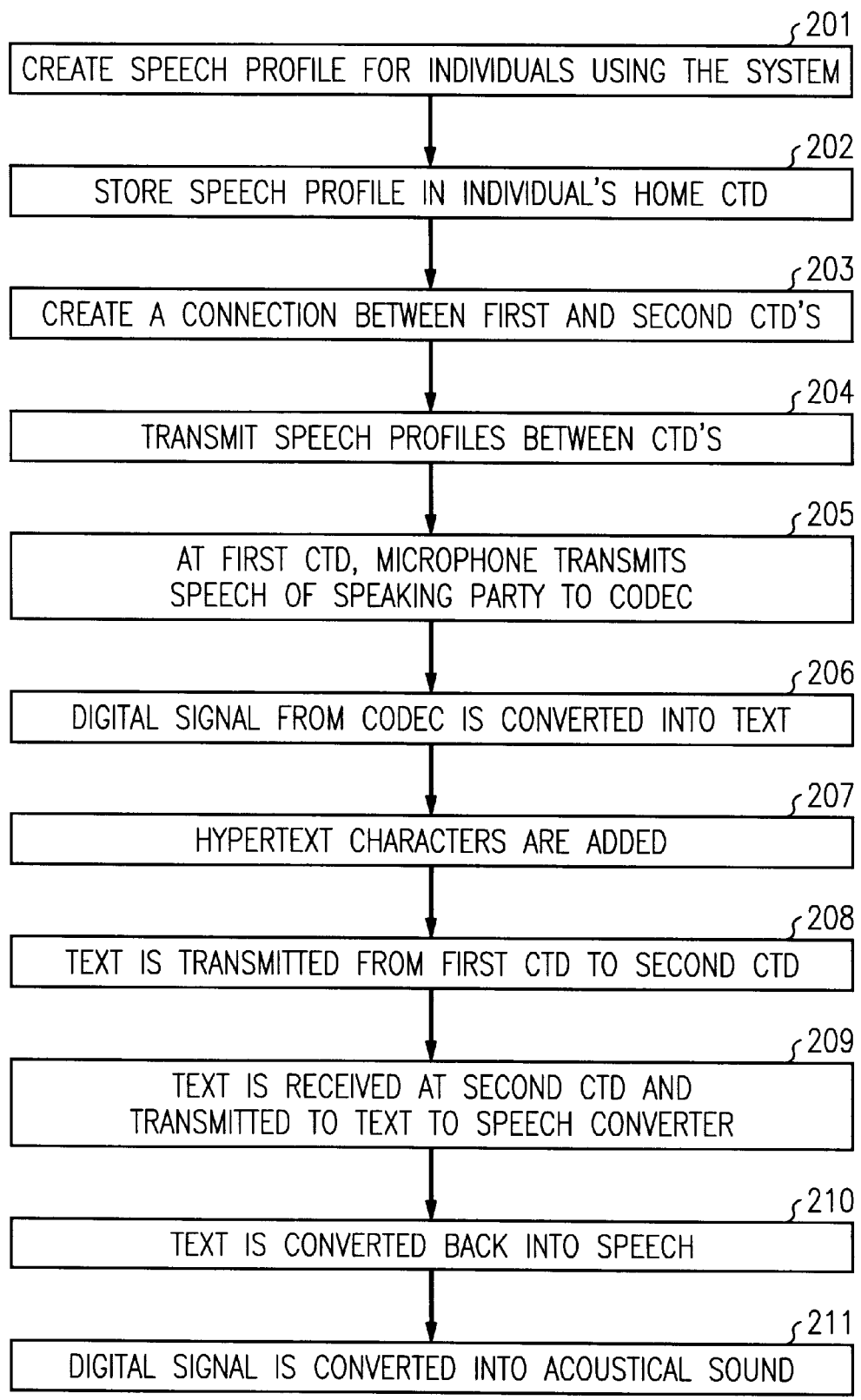
FIG. 2 is a flow chart illustrating the operation of the system of the invention.

Operation of the system of the invention will now be described with reference to FIG. 2. To initiate the system, each individual desiring to use the system creates a speech profile (block 201). Specifically, the CTD is placed in learn mode and the individual speaks into the microphone 8. The codec 12 converts the analog signal into a digital signal and the digital signal is delivered to the processor 14 where the speech profile is created by the speech to text converter 24. Since the speech to text converter knows it is in learn mode, it begins to analyze the voice of the user and determines the mathematical model of the user by analyzing the center frequency, range of deviations from this frequency, and all of the harmonics associated with the user's voice as is known in the art. In order for the speech to text converter to accomplish this, it must know the content of what the user is going to speak. Hence, the user speaks a set of prescribed sentences for the speech to text converter to assemble the mathematical model.

Once a speech profile is created by each party at their respective home CTD it is stored in the RAM 18 of that CTD (block 202). A compressed speech conversation can then be conducted between any of the parties. For example, assume a call is initiated by a first party (the calling party) from CTD 2. A connection is created between CTD 2 and a second party (the called party) at CTD 4 over transmission media 6 as is known in the (block 203). When the connection is established, the processors 14 of CTDs 2 and 4 transmit the speech profiles stored in RAM of the calling party and called party, respectively, to the other CTD such that RAM 18 of each CTD contains both the speech profile of the person using that CTD and the speech profile of the person using the other CTD (block 204). At this point a two way conversation can begin.

Assume that a first party speaks into the microphone 8 of CTD 2. The microphone 8 transmits the analog signal to codec 12 where it is converted into a digital signal (block 205). The digital signal is converted into ASCII text using the speaker's speech profile as previously described (block 206). Hypertext characters are added during the conversion process where appropriate to create an accurate representation of the speech (block 207). The ASCII text is transmitted at extremely low data rates over transmission media 6 to the other CTD 4 (block 208).

CTD 4 receives the signal containing ASCII text at modem 26 and delivers it to the text to speech converter (block 209). The text to speech converter converts the text back into speech using the speech profile of the speaker received from CTD 2 (block 210). The digital speech is transmitted to codec 12 where it is converted into an analog signal and the analog signal is transmitted to the speaker 10 where the analog signal is converted into acoustic speech and delivered to the called party (block 211). The process is reversed when the called party at CTD 4 speaks such that the system is operated in full duplex mode. Once the connection is terminated, the speech profiles of the parties that were transmitted to the opposite CTD at the initiation of the connection are deleted from RAM.

Figure 3:
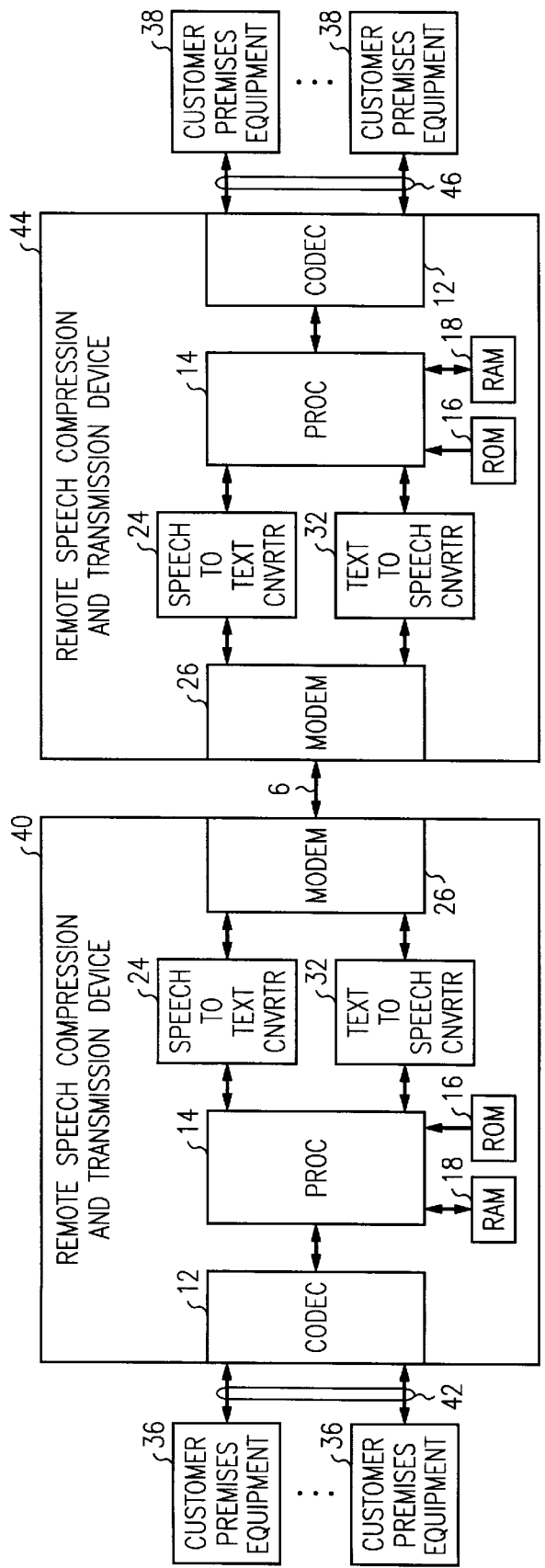
FIG. 3 is a block diagram illustrating a second embodiment of the system of the invention.

An alternative embodiment of the invention is shown in FIG. 3 that eliminates the need for expensive customer premise equipment and allows wider access to the speech compression system of the invention. In FIG. 3 like reference numerals are used to identify like components previously described with reference to FIG. 1. Specifically, customer premise equipment 36 and 38 consists of standard telephone sets, multimedia equipment or the like having a speaker and microphone. Each piece of customer premise equipment 36 is connected to a first remote CTD 40 via customer lines 42 such as a twisted wire pair. Customer lines 42 are connected to the codec 12 of the remote CTD 40. Likewise, each piece of customer premise equipment 38 is connected to a second remote CTD 44 via customer lines 46 such as a twisted wire pair. Customer lines 46 are connected to the codec 12 of the remote CTD 44. Remote CTDs 40 and 44 are constructed and operate as previously described to convert speech received from the microphone of customer premise equipment 36 and 38, respectively, into ASCII text and ASCII text received from other CTDs back into speech. The ASCII text is transmitted between remote CTDs 40 and 44 via the transmission media 6 as previously described. While the remote CTDs 40 and 44 are shown as standalone devices interconnected by the transmission media 6, it will be appreciated that the CTDs could be incorporated into a switching system or other network element if desired. The system illustrated in FIG. 3 operates as previously described with reference to FIG. 2 with the added step that the signal is transmitted between the customer premise equipment 36 and 38 to the remote CTDs 40 and 44 over customer lines 42 and 46, respectively.

It is contemplated that the CTDs of FIG. 1 or the remote CTDs of FIG. 3 could be accessed by more than one individual. In such a circumstance, the speech profiles of all persons having the capability of accessing the CTD (i.e. all persons using the CTD as their "home" CTD) must be stored in the RAM of the CTD. Thus, when a person either initiates or answers a call, that person must enter a personal identification number (or other identifier) that uniquely identifies that person's speech profile. In this manner the CTD will be able to identify and utilize the appropriate speech profile. It also contemplated that in the embodiment of FIG. 3, the speech profile could be stored in customer premise equipment 36 and 38 and transmitted to the remote CTDs 40 and 44, respectively, during the call set up. Other changes and modifications can be made in the details of the construction and operation of the invention without departing from the spirit and scope of the invention.

What is claimed is:

1. A compressed voice communication system, comprising:

at least two customer premise devices connected by a transmission media for allowing signals to be transmitted between said customer premise devices;

each of said at least two customer premise devices comprising:

means for receiving speech from an individual;

a speech profile defining coefficients of speech for the individual in a mathematical model;

means for detecting changes in the individual's speech, said changes being defined by at least one of said coefficients of speech;

means for converting said speech to text which operates in response to means for detecting to add hypertext characters to said text indicative of said detected changes;

means for transmitting said text from one customer premise device over said transmission media for receipt at another one of the at least two customer premise devices;

means for converting said text received from said transmission media to speech; and means for delivering speech to the individual.

2. The system according to claim 1, wherein said transmission media includes a satellite system.

3. The system according to claim 1, wherein said transmission media includes a cellular network.

4. The system according to claim 1, wherein said transmission media includes a public switched telephone network.

5. The system according to claim 1, wherein said means for receiving speech from an individual includes a microphone for converting the speech into an electrical signal.

6. The system according to claim 5, wherein each of said at least two customer premise devices further include a codec for converting said electrical signal into a digital signal.

7. The system according to claim 1, wherein said means for delivering speech to the individual includes a speaker for converting an electrical signal into speech.

8. The system according to claim 1, wherein said means for converting said speech to text uses said speech profile to create said text.

9. The system according to claim 1, wherein said means for converting text received from said transmission media to speech uses the speech profile of the individual whose speech is being converted.

10. The system according to claim 1, wherein each of said at least two customer premise devices include means for storing a speech profile of said individual.

11. A device for compressing and transmitting speech in a communications system, comprising:
 means for receiving speech from an individual;
 a speech profile defining the coefficients of speech for the individual in a mathematical model;
 means for detecting changes in the individual's speech, said changes being defined by at least one of said coefficients of speech;
 means for converting said speech to text which operates in response to means for detecting to add hypertext characters to said text indicative of said detected changes;
 means for transmitting said text over said transmission media;
 means for converting said text received from said transmission media to speech; and
 means for delivering speech to the individual.

12. The device according to claim 11, wherein said transmission media includes a satellite system.

13. The device according to claim 11, wherein said transmission media includes a cellular network.

14. The device according to claim 11 wherein said transmission media includes a public switched telephone network.

15. The device according to claim 11, wherein said means for receiving speech from an individual includes a microphone for converting the speech into an electrical signal.

16. The device according to claim 15, including a codec for converting said electrical signal into a digital signal.

17. The device according to claim 11, wherein said means for delivering speech to the individual includes a speaker for converting an electrical signal into speech.

18. The device according to claim 11, wherein said means for converting said speech to text uses said speech profile to create said text.

19. The device according to claim 11, wherein said means for converting text received from said transmission media to speech uses the speech profile of the individual whose speech is being converted.

20. The device according to claim 11, further including means for storing a speech profile of said individual.

21. A compressed voice communication system, comprising:
 at least one customer premise device connected to a first device for compressing and transmitting speech;
 at least one other customer premise device connected to a second device for compressing and transmitting speech;
 a transmission media connecting said first and second devices for compressing and transmitting speech for transmitting signals therebetween;
 each of said first and second devices for compressing and transmitting speech, comprising:
  means for receiving speech from said at least one customer premise device;
  a speech profile defining coefficients of speech for an individual in a mathematical model;
  means for detecting changes in the individual's speech, said changes being defined by at least one of said coefficients of speech;
  means for converting said speech to text which operates in response to said means for detecting to add hypertext characters to said text indicative of said detected changes;
  means for transmitting said text over said transmission media;
  means for converting text received from said transmission media to speech; and
  means for delivering speech to said at least one customer premise device.

22. The system according to claim 21, wherein said transmission media includes a satellite system.

23. The system according to claim 21, wherein said transmission media includes a cellular network.

24. The system according to claim 21, wherein said transmission media includes a public switched telephone network.

25. The system according to claim 21, wherein said first and second devices include means for storing a speech profile representative of an individual's speech.

26. The system according to claim 21, wherein each of said first and second devices further include a codec for converting said electrical signal into a digital signal.

27. The system according to claim 21, wherein said means for converting said speech to text uses said speech profile to create said text.

28. The system according to claim 21, wherein said means for converting text received from said transmission media to speech uses the speech profile of the individual whose speech is being converted.

29. In a voice communication system having at least a first speech compression and transmission device and a second speech compression and transmission device connected by a transmission media for transmitting signals therebetween, a method for transmitting compressed speech comprising the steps of:
 defining a first speech profile for a first individual and storing said first speech profile in said first speech compression and transmission device;
 defining a second profile for a second individual and storing said second speech profile in said second speech compression and transmnission device;
 establishing a connection between said first speech compression and transmission device and said second speech compression and transmission device;

detecting changes in the individual's speech;

adding hypertext characters to the text in response to the detected changes;

transmitting said first speech profile to the second speech compression and transmission device and transmitting said second speech profile to the first speech compression and transmission device;

receiving speech from said first individual and converting the speech to text using the first speech profile at said first speech compression and transmission device;

transmitting said text from the first speech compression and transmission device to the second speech compression and transmission device; and converting the text received from the first speech compression and transmission device to speech at the second speech compression and transmission device using the first transmitted speech profile.

30. The method of claim 29, wherein the step of detecting changes includes the step of detecting pitch and rate.

* * * * *